US012600476B2

(12) United States Patent  
Patzlsperger et al.

(10) Patent No.: US 12,600,476 B2  
(45) Date of Patent: Apr. 14, 2026

(54) LOCKING DEVICE AND CARGO DECK

(71) Applicant: TELAIR INTERNATIONAL GMBH, Miesbach (DE)

(72) Inventors: Andreas Patzlsperger, Waakirchen (DE); Robert Passreiter, Röhrmoos (DE); Josef Eham, Miesbach (DE)

(73) Assignee: Telair International GMBH, Miesbach (DE)

( * ) Notice: Subject to any disclaimer, the term of this patent is extended or adjusted under 35 U.S.C. 154(b) by 892 days.

(21) Appl. No.: 17/737,628

(22) Filed: May 5, 2022

(65) Prior Publication Data

US 2022/0355934 A1 Nov. 10, 2022

(30) Foreign Application Priority Data

May 6, 2021 (DE) ........................... 102021111856.5

(51) Int. Cl.  
B64D 9/00 (2006.01)  
B64C 1/20 (2006.01)

(52) U.S. Cl.  
CPC ................ B64D 9/003 (2013.01); B64C 1/20 (2013.01); *B64D 2009/006* (2013.01)

(58) Field of Classification Search  
CPC .... B64D 9/003; B64D 2009/006; B64D 9/00; B64F 1/00; B64C 1/20  
USPC ........ 410/5, 7, 8, 31, 34, 38, 73, 74, 75, 77, 410/78, 79, 80, 83, 84, 88, 95  
See application file for complete search history.

(56) References Cited

U.S. PATENT DOCUMENTS

| | | | |
|---|---|---|---|
| 3,906,870 A | 9/1975 | Alberti | |
| 4,077,590 A | 3/1978 | Shorey | |
| 4,457,649 A * | 7/1984 | Vogg ...................... | B64D 9/003 244/137.1 |
| 5,346,161 A | 9/1994 | Eilenstein-Wiegmann et al. | |
| 5,564,654 A * | 10/1996 | Nordstrom ............. | B64D 9/003 248/500 |
| 5,816,758 A | 10/1998 | Huber | |
| 7,429,157 B2 | 9/2008 | Schulze et al. | |
| 9,540,106 B2 * | 1/2017 | Huber .................... | B64D 9/003 |
| 10,377,572 B1 * | 8/2019 | Meidinger ......... | B65G 21/2072 |

(Continued)

FOREIGN PATENT DOCUMENTS

| | | |
|---|---|---|
| DE | 102006048405 | 5/2007 |
| DE | 102010036983 | 2/2012 |

(Continued)

OTHER PUBLICATIONS

Extended Search Report issued in Appl. No. EP23220738.1 (Feb. 28, 2024).

*Primary Examiner* — Daniel J Colilla  
(74) *Attorney, Agent, or Firm* — Barnes & Thornburg LLP

(57) ABSTRACT

A locking device for securing cargo items in a cargo deck of an aircraft. The locking device includes a frame having at least two longitudinal members, at least two fastening claws each with a locking lug, and at least two guide rails. The fastening claws are movably mounted on carriage elements. Each guide rail can be fastened to a respective longitudinal member at different positions. The at least two carriage elements are displaceably mounted on the guide rails. At least one compression spring may be formed between the carriage elements, so that the two carriage elements are spring-mounted with respect to one another.

16 Claims, 7 Drawing Sheets

(56)           References Cited

U.S. PATENT DOCUMENTS

2007/0086870 A1 *   4/2007  Schulze ................... B60P 7/13
                                                                 410/77
2012/0037753 A1     2/2012  Huber et al.

FOREIGN PATENT DOCUMENTS

EP          0753457       1/1997
EP          3061690       8/2016
GB          2043584      10/1980
WO    WO 2010/149179     12/2010

* cited by examiner

100

LOCKING DEVICE AND CARGO DECK

CROSS REFERENCE TO RELATED APPLICATIONS

This application claims priority to German Patent Application No. 10 2021 111 856.5, filed May 6, 2021. The disclosure set forth in the referenced application is incorporated herein by reference in its entirety.

FIELD OF THE DISCLOSURE

The invention relates to a locking device for securing cargo items on a cargo deck of an aircraft. Furthermore, the invention relates to a cargo deck of an aircraft having at least one locking device.

BACKGROUND

When transporting cargo in aircraft, cargo items such as containers or pallets ("unit load devices—ULDs") are often used, which are cuboid or trapezoidal or have a shape with a special outer contour. Such containers or pallets can be loaded longitudinally or transversely, depending on the cargo space of the aircraft. It is thus necessary to adapt locking elements with regard to their position in the cargo hold floor. Such locking units must therefore be laterally adjustable in order to be able to lock asymmetrical loading configurations or different ULD widths.

Containers or similar cargo to be secured on the cargo floor of an aircraft can be of different sizes. Locking elements with locks are used to secure containers. The locks surround and hold a section of the container or cargo pallet. For this purpose, the distances between the locks for holding a cargo item must correspond to the size of the respective cargo item. If the distances between the locks do not correspond to the sizes of the cargo items, these cargo items cannot be reliably secured by the locks.

A locking element of the type mentioned above is known from EP 0 753 457 B1. The position of the locks of this locking element cannot be changed. Thus, the spacing of locks cannot be adapted to containers of different sizes.

Furthermore, it is preferably provided that locking units must be able to be driven over by wider ULDs in the case of single-track loading. It is the wish of users that the corresponding locking elements fold down automatically when driven over so that easy loading is possible even in the presence of wider ULDs.

It may be necessary to lock locking elements in a folded-down state or in the folded-down configuration to prevent unintentional erection.

Furthermore, it has been shown in the past that in the case of so-called "wing opening" load cases, the wings of the aircraft bend and deform downward due to high wind loads in such a way that this causes the aircraft structure of the cargo hold to deform outward in the lateral horizontal direction.

During such events, locking elements for pallets and containers on the outside of the cargo deck move in an outward direction. This widens the entire track width for pallets and containers or for the corresponding cargo items. Such load cases can result in ULDs no longer being adequately secured by existing locking elements and becoming detached from the locking elements. In the worst case, ULDs could become detached from the vertical interlock, so that adequate interlocking is not possible at such points.

Furthermore, it is a frequent application request that locking elements in the area of lateral cargo doors of the cargo deck of an aircraft can be moved sideways and folded down during loading and unloading of ULDs. This is intended to allow lateral transfer through a cargo door without ULDs colliding with the locking elements.

SUMMARY

In light of the foregoing, it is an object of the present invention to disclose a more advanced locking device for securing cargo items on a cargo deck of an aircraft, taking into account the foregoing desired applications.

It should thus be possible for locking elements, in particular fastening claws, to be displaced in the lateral direction.

Furthermore, the locking device should ensure adequate securing of cargo items in the so-called "wing opening" load case. The locking device should be designed in such a way that automatic folding-down is possible when the fastening claws are passed over. Simple detection of whether the fastening claw is locked in a folded-down state is also desirable.

It is further an object of the present invention to disclose a more advanced cargo deck having a more advanced locking device.

This object is solved with regard to the locking device with the features in accordance with the present disclosure, and with regard to a cargo deck with the features in accordance with the present disclosure.

Advantageous further developments result from the illustrative embodiments of the present disclosure.

In particular, the object of the invention is solved by a locking device for securing cargo items on a cargo deck of an aircraft, comprising:

a frame having at least two longitudinal members, at least two fastening claws, each with a locking lug, wherein the fastening claws are movably mounted on carriage elements, at least two guide rails, wherein one guide rail in each case can be fastened to one longitudinal member in each case at different positions and the at least two carriage elements are mounted displaceably on the guide rails, wherein at least one compression spring is formed between the carriage elements so that the two carriage elements are spring-mounted with respect to each other.

A locking device is assumed which has at least two fastening claws with locking lugs located thereon. The fastening claws are slidable and fixable in the frame such that the position of the fastening claws and the locking lugs thereon in the cargo deck of an aircraft can be adjusted. Thus, the distance between the fastening claws for securing a container can be adapted to different sizes of containers, in particular ULDs.

Preferably, the frame comprises at least two longitudinal members and preferably at least two end cross members. Preferably, the frame comprises four side elements formed by two longitudinal members and two cross members.

Since the at least two fastening claws are each movably mounted separately on carriage elements, the fastening claws can perform independent pivoting movements. The actual locking or fastening of the cargo items is performed by means of the locking lugs located on the fastening claws.

The distance between the fastening claws is variable. The distance can be adapted to specific loading situations by forming at least one compression spring between the carriage elements so that the two carriage elements are spring-mounted with respect to each other.

In particular, in the "wing opening" loading case, the locking lugs can further ensure the securing of the cargo pieces by moving the carriage elements away from each other. The respective fastening lugs can follow the respective secured pallet or container in the case of "wing opening" load cases, so that vertical locking of the load of the respective cargo items is ensured for both fastening lugs.

After the so-called "wing openings" load case has ended, the carriage elements can be moved towards each other again due to the compression spring formed between the carriage elements. The distance between the carriage elements is reduced so that the fastening claws with the locking lugs located on them can continue to secure the cargo items in the vertical direction.

The carriage elements are displaceably mounted on the guide rails. For this purpose, the carriage elements preferably have sliding elements on two sides, so that the carriage elements themselves are displaceably mounted on the guide rails. Due to the free movement of the carriage elements in the guide rails, lateral suspension can be made possible.

In other words, the carriage elements are not directly connected to the at least two longitudinal members or are not directly mounted on the longitudinal members. The at least two guide rails form a kind of intermediate carriage element, so that a lateral suspension is positively influenced. The fastening claws in the carriage elements are preferably arranged in such a way that the fastening claws can be folded down (in opposite pivoting directions).

With the help of the design of a guide rail as a kind of intermediate element for mounting the fastening claws on the longitudinal members of a frame, it is possible for the fastening claws to be displaceable in pairs along the longitudinal members.

The guide rails are preferably detachably fastened in or on the longitudinal members. In a particularly preferred embodiment, the guide rails are detachably fastened in groove-shaped recesses in the longitudinal members. The guide rails are detachably fastened in such a way that the guide rails can be arranged variably in terms of their respective position in relation to the respective longitudinal member.

The guide rails are preferably designed to be congruent with each other. In other words, there should be no lateral offset between the guide rails. Rather, the guide rails should be displaceable in the same direction in the longitudinal members. A variable arrangement of the guide rails in or on the longitudinal members is preferably possible by means of different openings formed in the longitudinal members. Due to different distances between the openings and the number of openings, these openings in the longitudinal members allow different positions with regard to the fastening claws in relation to the longitudinal members or the entire frame.

It is possible that the guide rails can be connected to each other. For example, the guide rails can be connected to each other by means of cross members and/or connecting webs. Likewise, it is possible that the guide rails are connected to each other by means of a single connecting web. In such an embodiment of the invention, the connecting web is formed centrally with respect to the longitudinal extension of both guide rails. In a plan view, the guide rails form an H-shape with the central connecting web.

Interconnected guide rails can form a carriage or a frame.

Preferably, the at least two guide rails, the at least two fastening claws and the at least two carriage elements form an assembly, wherein this assembly can be variably positioned and fastened in relation to the longitudinal members.

The assembly can be moved completely in relation to the longitudinal members or the entire frame. This allows the fastening claws to be positioned off-center. This allows an asymmetrical ULD configuration to be loaded and fastened.

Due to the additional bearing of the carriage elements in the two guide rails, so that the carriage elements can be moved against each other and are spring-loaded, the "wing opening" load cases already mentioned can be observed with regard to the correct locking and fastening of cargo items in the process.

In a particularly preferred embodiment of the invention, at least two spring units are formed between the carriage elements, wherein one spring unit comprises at least one compression spring. In other words, at least two compression springs may be formed between the carriage elements. Preferably, the spring units are located at different positions between the at least two carriage elements. Preferably, the arrangement is symmetrical in relation to a longitudinal axis of the locking device formed between the two guide rails. This serves to ensure a correspondingly uniform load on the two spring units.

Since the at least one compression spring, preferably the at least two spring units, are formed between the carriage elements, the at least one compression spring or the at least two spring units are co-moved accordingly when the above-mentioned assembly is moved. Thus, there is no need to form separate spring units for different positioning of the fastening claws. This simplifies the design of the locking device and minimizes the number of spring units required.

At least one fastening claw can be rotatably mounted on a carriage element about an axis of rotation which extends essentially perpendicular to the guide rails. When the axis of rotation is substantially perpendicular to the guide rails, this is not necessarily meant to be a mathematically correct perpendicular configuration. Rather, this is intended to indicate the relative tendency of the orientation of the axis of rotation.

The two longitudinal members of the frame can also be referred to as bending members, in particular as lateral bending members. Accordingly, the longitudinal members serve to absorb forces acting on the fastening claws.

The guide rails cause high tensile and torsional forces acting on the fastening claws to be transmitted to the two longitudinal members. Since the carriage elements are not connected directly to the longitudinal members, for example by means of stub axles, much higher tensile and torsional forces can be absorbed thanks to the guide rails.

The at least one fastening claw can be locked in a folded-down position by means of a toggle mechanism. By means of the toggle mechanism, the fastening claw is pivotably fastened to the carriage element. The toggle mechanism has at least two lever elements connected to one another in an articulated manner. The toggle mechanism is designed such that the fastening claw is automatically locked in a folded-down position.

The toggle mechanism preferably has a release device, in particular a release button or a release pin, wherein actuation of the release device releases the toggle mechanism from a locked position. Preferably, the release device is formed as a section of at least one lever element of the toggle mechanism. Due to the actuation of the release device, the further lever element, in particular the lever element that is connected to the fastening claw or is located in the fastening claw, is released from a maximum locked position.

The folded-down position of the fastening claw relates to the position of the fastening claw in which the fastening claw no longer protrudes vertically above the guide rails. The folded-down position causes the fastening claw and the locking lug located on it to sink below the uppermost side edge of the longitudinal members. It is thus possible for cargo items, in particular ULDs, to be transported via the locking device in this folded-down position of the fastening claw.

Preferably, the frame of the locking device includes fastening devices for attaching the frame to a cargo compartment floor of an aircraft.

At least one of the guide rails can be designed as a C-profile rail. This enables the carriage elements to be mounted in the guide rails in such a sliding manner that sliding elements of the carriage elements are prevented from slipping out of the guide rail sideways.

At least one guide rail can be detachably fastened to at least one of the longitudinal members by means of a fastening pin, in particular a pretensioned fastening pin, wherein the fastening pin engages in an opening in the guide rail.

In a further embodiment, the fastening pin comprises a spring. The fastening pin can be mounted so that it can be displaced against a spring force to release a connection with the guide rail. This has the advantage that the fastening pin can be easily released. Another advantage is that a fastening pin can easily engage at defined positions, i.e. in the near vicinity of an opening in the guide rail, due to the spring force.

In a preferred embodiment of the invention, the fastening pin can be locked and/or released by means of a slotted guide device.

At least one stop element for at least one carriage element can be formed in the guide rail. The carriage element can be freely movable in the guide rail over a defined distance. With the aid of the stop element, the force is transmitted from the carriage element via the stop element into the guide rail and from the guide rail into the longitudinal member when the carriage element is in contact with the stop element.

Preferably, the at least one stop element in the guide rail is designed as a stop element for at least two carriage elements. The stop element can be used to set the smallest possible distance between the carriage elements. Preferably, the stop element in the guide rail is designed as a projection. The stop element is preferably formed at a central position in lateral extension.

In a further embodiment of the invention, a carriage element has stop surfaces and/or stop edges that limit a pivoting movement of the fastening claw. In other words, stop surfaces and/or stop edges of the carriage element can be used to define the radius of movement of the fastening claw. This applies both to the movement of the fastening claw to assume a folded-down position and to the radius of movement of the fastening claw to assume an unfolded position.

A further, in particular alternative independent, aspect of the invention relates to a locking device for securing cargo items on a cargo deck of an aircraft, comprising:

a frame having at least two longitudinal members,
at least one fastening claw with a locking lug, with the fastening claw being movably mounted on a carriage element, wherein the fastening claw is rotatably mounted on the carriage element about an axis of rotation which extends substantially perpendicularly to the guide rails, wherein the fastening claw can be locked in a folded-down position by means of a toggle mechanism.

With regard to the individual elements of the locking device, i.e. with regard to the frame and/or the longitudinal members and/or the fastening claw and/or the locking lug and/or the carriage element and/or the toggle mechanism, reference is made to previous explanations concerning these elements.

The locking device thus has at least one fastening claw which has a toggle mechanism. The formation of the toggle mechanism has the advantage that the fastening claw can be locked automatically when pressed down. The fastening claw can be pivoted out again by pressing lightly on a release device.

The toggle mechanism preferably has a release device, in particular a release button or release pin, wherein the release device, when actuated, releases the toggle mechanism from a locked, folded-down position of the fastening claw.

Pressure on the release device can be applied, for example, by means of actuation by foot. Using the toggle mechanism, both locking and unlocking can be performed with a foot. This fulfills the ease of use.

Due to the toggle mechanism designed according to the invention, the fastening claw can be locked in the folded-down position. Due to the support of the toggle lever on a carriage element, this concept of the toggle lever mechanism can also be used for locking devices based on the concept of two separate, individually displaceable fastening claws.

The toggle mechanism is protected in the fastening claw. On the one hand, this reduces the risk of damage to the mechanism. Furthermore, the mechanism can be effectively protected from dirt and moisture.

By varying the folding-down depth, the toggle mechanism can be adjusted in such a way that the fastening claw is folded down when a piece of cargo, in particular a ULD, passes over it and is automatically locked in this folded-down position.

The formation of guide rails fastened to the longitudinal member, with the at least two carriage elements being displaceably mounted in the guide rails, enables improved force transmission between the fastening claws and the longitudinal members. Even with high transmitted forces, this allows the fastening claws and the longitudinal members to be made of aluminum. This results in high weight savings, as no elements of steel need to be formed.

In addition, the design of guide rails according to the invention and the carriage elements mounted therein enables better guidance or displaceability of the fastening claws. Furthermore, such an arrangement is less sensitive to dirt and protects against corresponding damage to the locking device.

Another aspect of the invention relates to a cargo deck of an aircraft having at least one locking device according to the invention. The frame of the locking device is attached in this case to the floor of the cargo deck.

Similar advantages result as have already been mentioned in connection with the locking device according to the invention.

BRIEF DESCRIPTION OF THE DRAWINGS

The invention is explained in more detail below with reference to the accompanying drawings. The embodiments shown represent examples of how the locking device according to the invention can be designed.

The drawings show as follows:

FIG. 5 is an enlarged view of FIG. 2a; and

In the following description, the same reference numbers are used for identical parts and parts with the same effect.

DETAILED DESCRIPTION

Figure 1A:
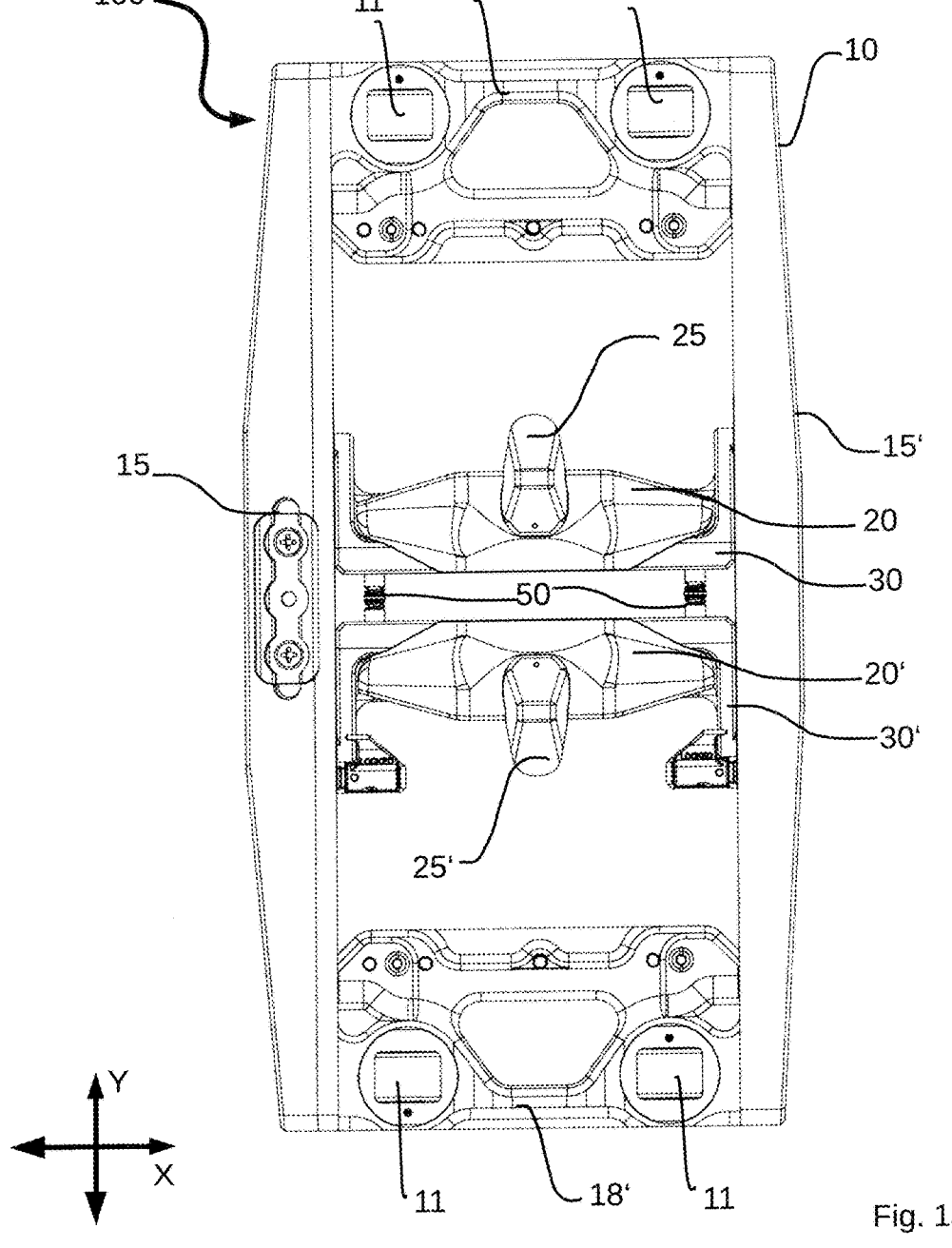
FIGS. 1a and 1b show the locking device according to the invention in a top view and in a perspective side view.
Figure 1B:
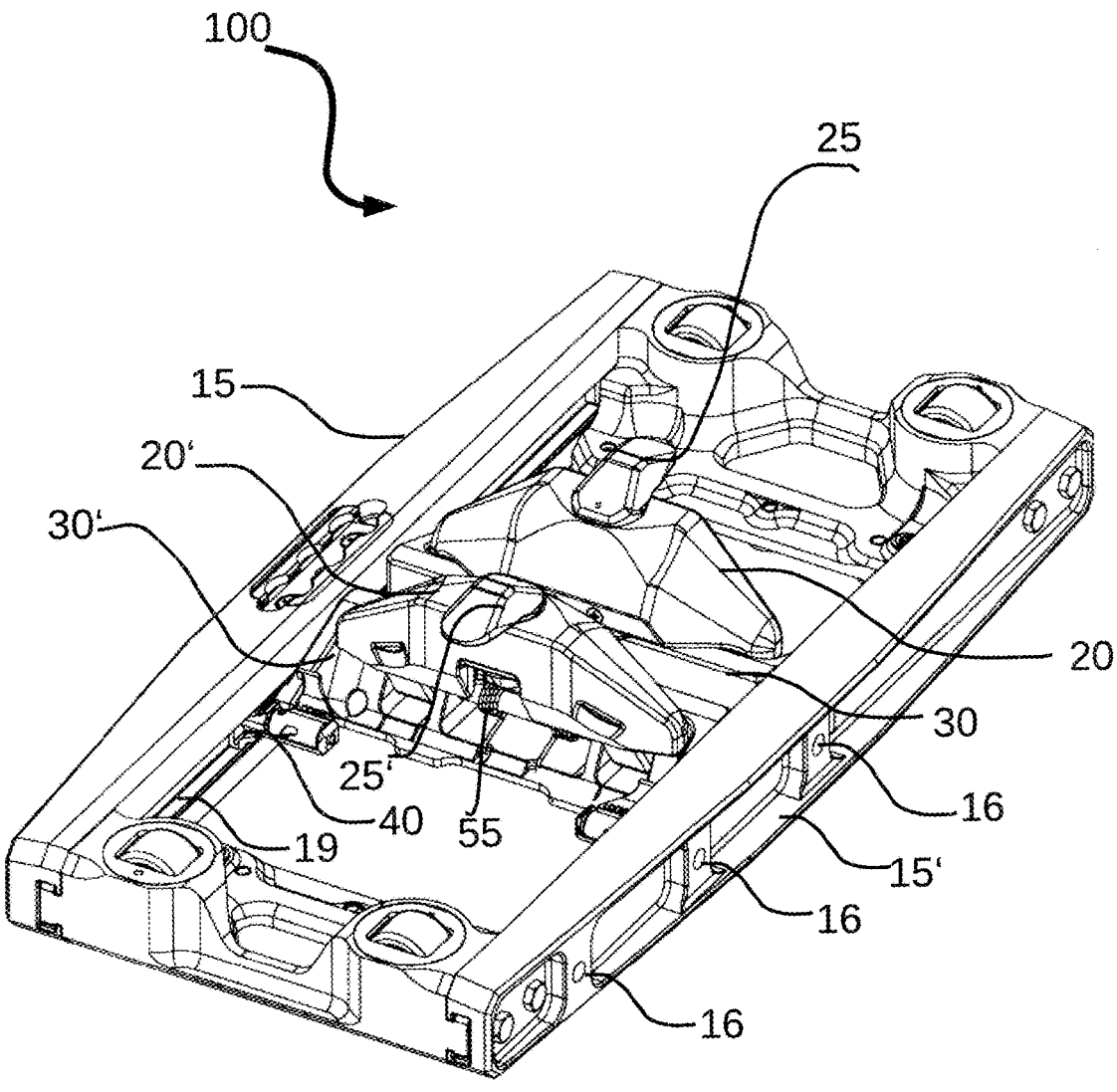

FIGS. 1a and 1b show a top view (FIG. 1a) and a perspective side view (FIG. 1b) of a possible embodiment with respect to a locking device 100.

The locking device 100 has a frame 10. The frame 10 has two longitudinal members 15, 15' as well as cross members 18, 18'. The frame 10 is formed by the four side elements, namely the two longitudinal members 15, 15' as well as the two cross members 18, 18'.

Rollers 11 are formed in the cross members 18, 18'. These rollers 11 are used to transport cargo, in particular ULDs, across the locking device 100.

Furthermore, two fastening claws 20, 20' can be seen. The fastening claws 20, 20' each have a locking lug 25, 25'.

The fastening claws 20, 20' are each movably mounted on a carriage element 30, 30'.

The locking device 100 further comprises two guide rails 40, 40'. In FIG. 1b, the left guide rail 40 can be seen at least in sections.

The guide rails 40, 40' can be fastened to the longitudinal members 15, 15' at different positions. For this purpose, the longitudinal members 15, 15' have openings 16 (see FIG. 1b, right side). In these openings 16, the guide rails 40, 40' can be fastened at different positions of the longitudinal members 15, 15'.

The carriage elements 30, 30' are displaceably mounted on the guide rails 40, 40'.

As can be seen in FIG. 1a, compression springs 50 are formed between the carriage elements 30, 30'. With the aid of the illustrated design of a locking device 100, it is possible for the carriage elements 30, 30' to be mounted, on the one hand, such that they can be displaced in the guide rails 40, 40', wherein it is possible for the guide rails 40, 40', in turn, to be fastened to different positions of the longitudinal members 15, 15'. Since the carriage elements 30, 30' are not mounted directly on the longitudinal members 15, 15', but the guide rails 40, 40' are designed as a kind of intermediate carriage, lateral suspension is made possible. The carriage elements 30, 30' can be moved in pairs along the y-axis together with the fastening claws 20, 20'.

Since compression springs 50 are formed between carriage elements 30 and 30', on which the fastening claws 20, 20' are movably mounted, these compression springs 50 are displaced together with the other components, i.e. together with the guide rail 40, 40', the carriage elements 30, 30' as well as with the fastening claws 20, 20'.

The two carriage elements 30, 30' can be moved against each other and are spring-mounted. In the event of a "wing opening" load case, the two fastening claws 20, 20' can follow the respective containers or ULDs so that vertical locking of the load is also ensured in this case.

The guide rails 40, 40' are detachably fastened to the longitudinal members in groove-shaped recesses 19 of the longitudinal members 15, 15'.

Figure 4:
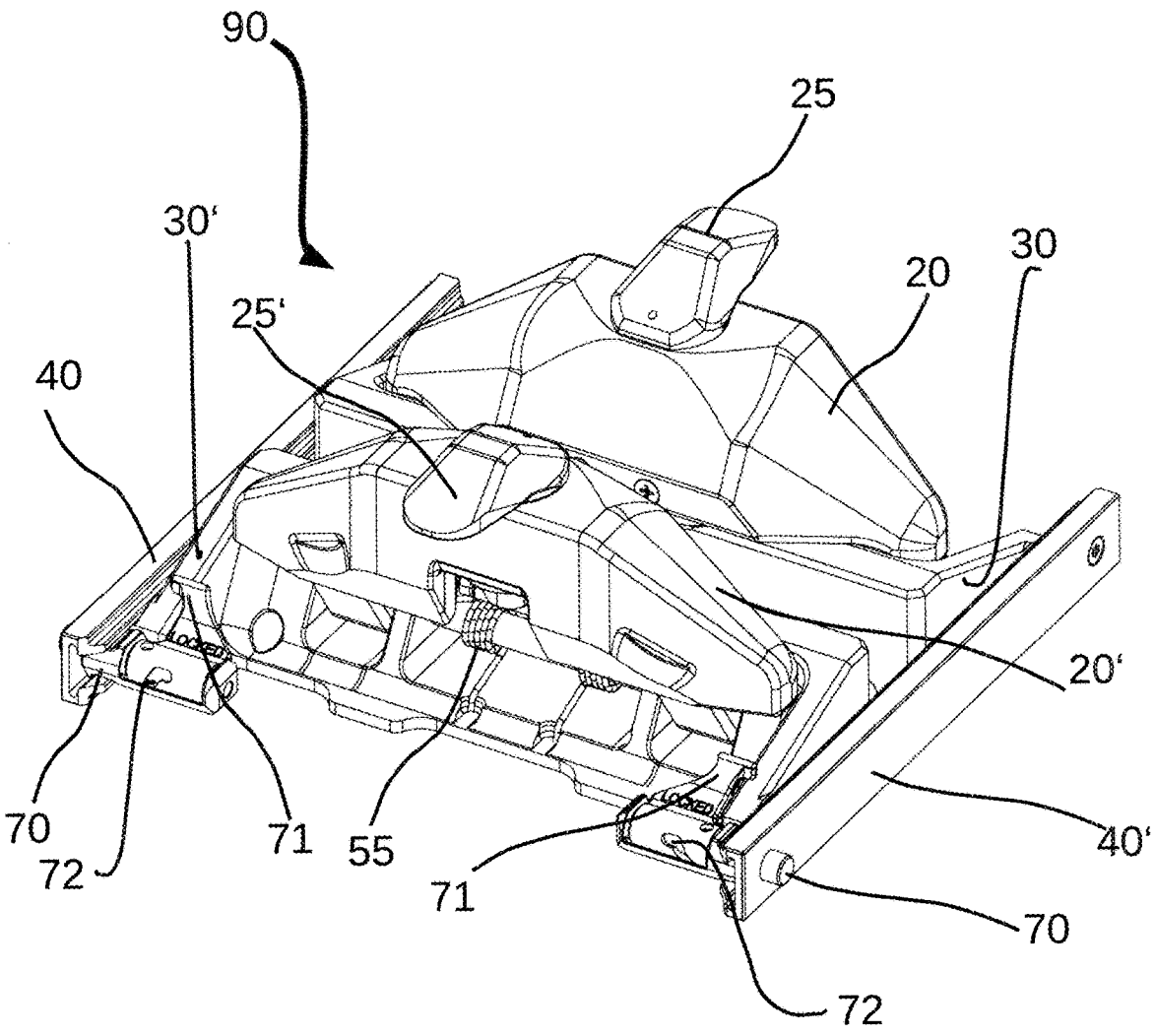
FIG. 4 shows a perspective view of an assembly of the locking device according to the invention.
Figure 5:
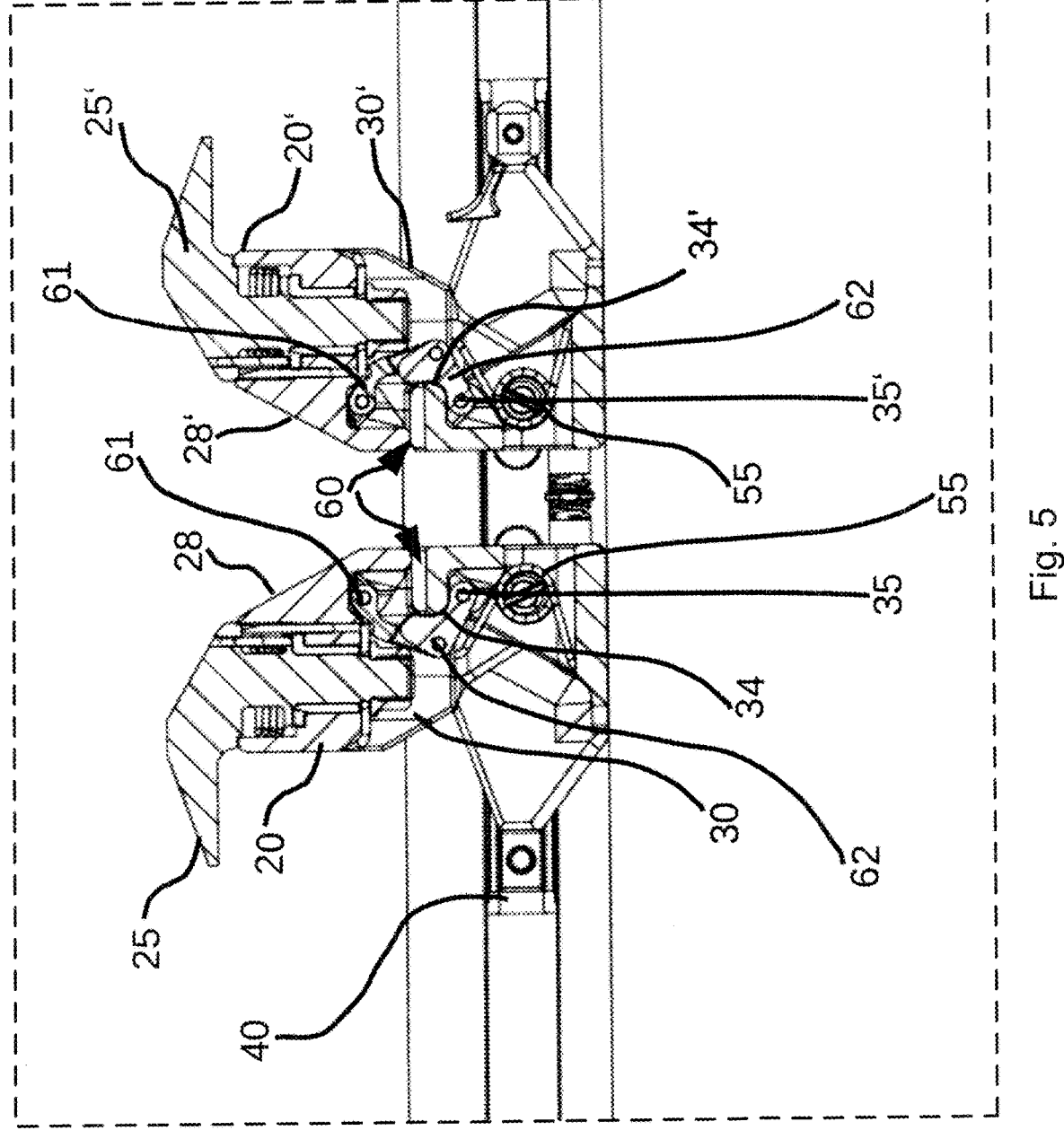
Figure 6:
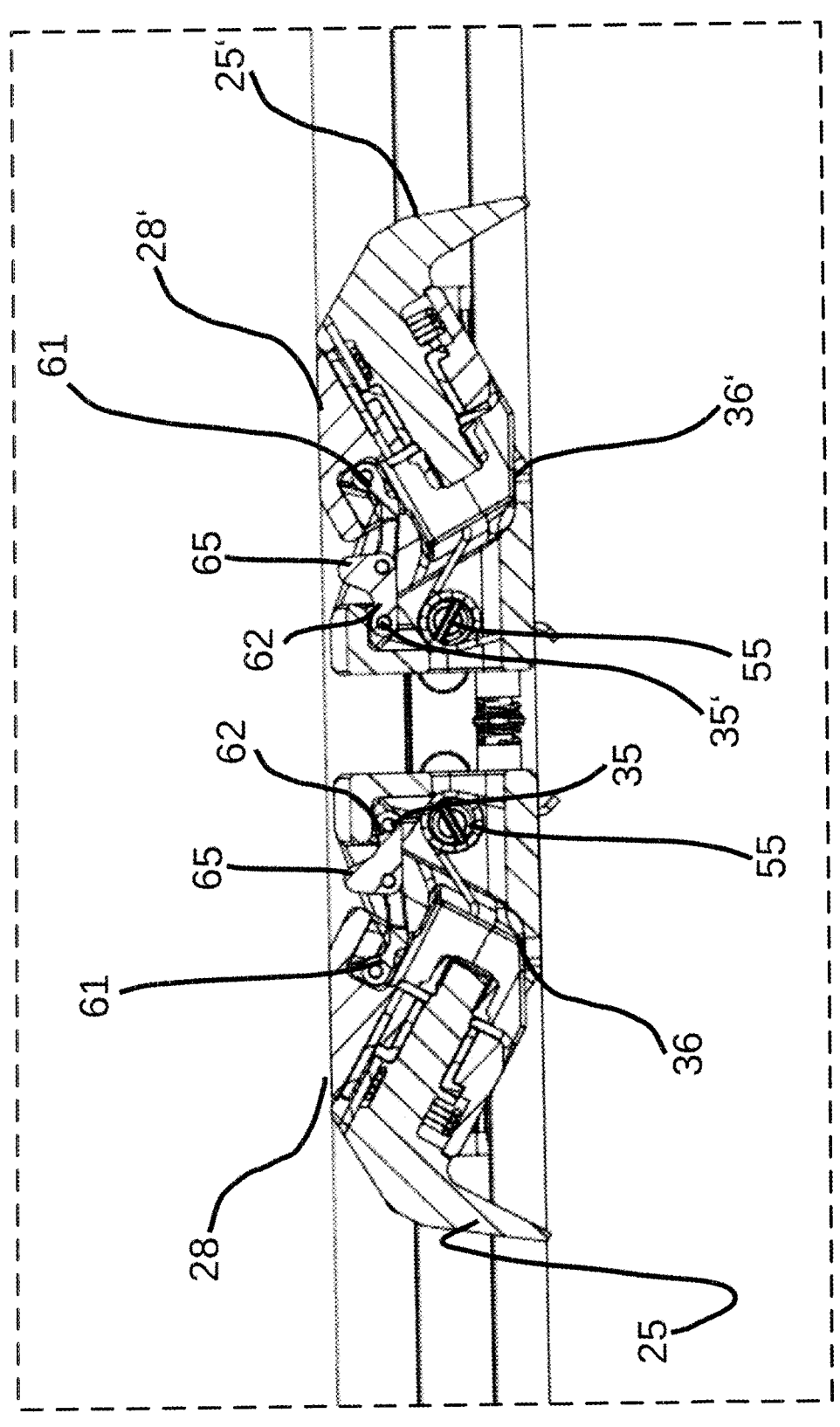
FIG. 6 is an enlarged view of FIG. 2b.

In FIG. 4, the assembly 90 is shown detached from the frame 10 or the longitudinal members 15, 15'. It can be seen that the assembly 90 is formed by the two guide rails 40, 40', the fastening claws 20, 20', the carriage elements 30, 30' and the compression springs (not visible here). This entire assembly 90 is displaceably mounted in the groove-shaped recesses 19 of the longitudinal members 15, 15'.

In FIG. 4, it can be seen that the attachment of the assembly 90 to the longitudinal members 15, 15' can be accomplished by means of a pretensioned fastening pin 70.

The fastening pin 70 engages in one of the openings 16 of the longitudinal members 15, 15' (see FIG. 1b). By means of a lever 71, a slotted guide device 72 can be actuated. With the aid of this slotted guide device 72, the fastening pin 70 can be locked as well as released. For example, in the illustrated embodiment, the slotted guide device 72 includes a structure coupled to the fastening pin 70 that moves within a slot such that rotation of the lever 71 drives the fastening pin 70 to slide into or out of the opening 16. Due to the pretensioning of the fastening pin 70, which is realized by means of a spring (not shown), the fastening pin 70 can slide independently into an opening 16, provided that the fastening pin 70 is located in the direct vicinity of the opening 16 and already partially engages therein. Subsequently, the device is closed manually by means of the lever 71. Furthermore, a stop element (not shown) can be formed in the guide rails 40, 40' at a central position with respect to the longitudinal extension. The carriage elements 30, 30' can stop centrally at this stop element, so that the minimum distance between the carriage elements 30, 30' can be set with the aid of a stop element.

In FIGS. 1a and 1b, the fastening claws 20, 20' are shown in an unfolded position. In such a position, locking or vertical fastening with a container/ULD would occur.

In order to be able to transport containers/ULDs over the locking device 100, the fastening lugs 20, 20' must be designed to be downwardly foldable. Furthermore, it is provided that the locking lugs 25, 25' can be folded away laterally. The fastening lugs 25 and 25' can thus be moved laterally in the direction of the x-axis.

Figures 2A, 2B:
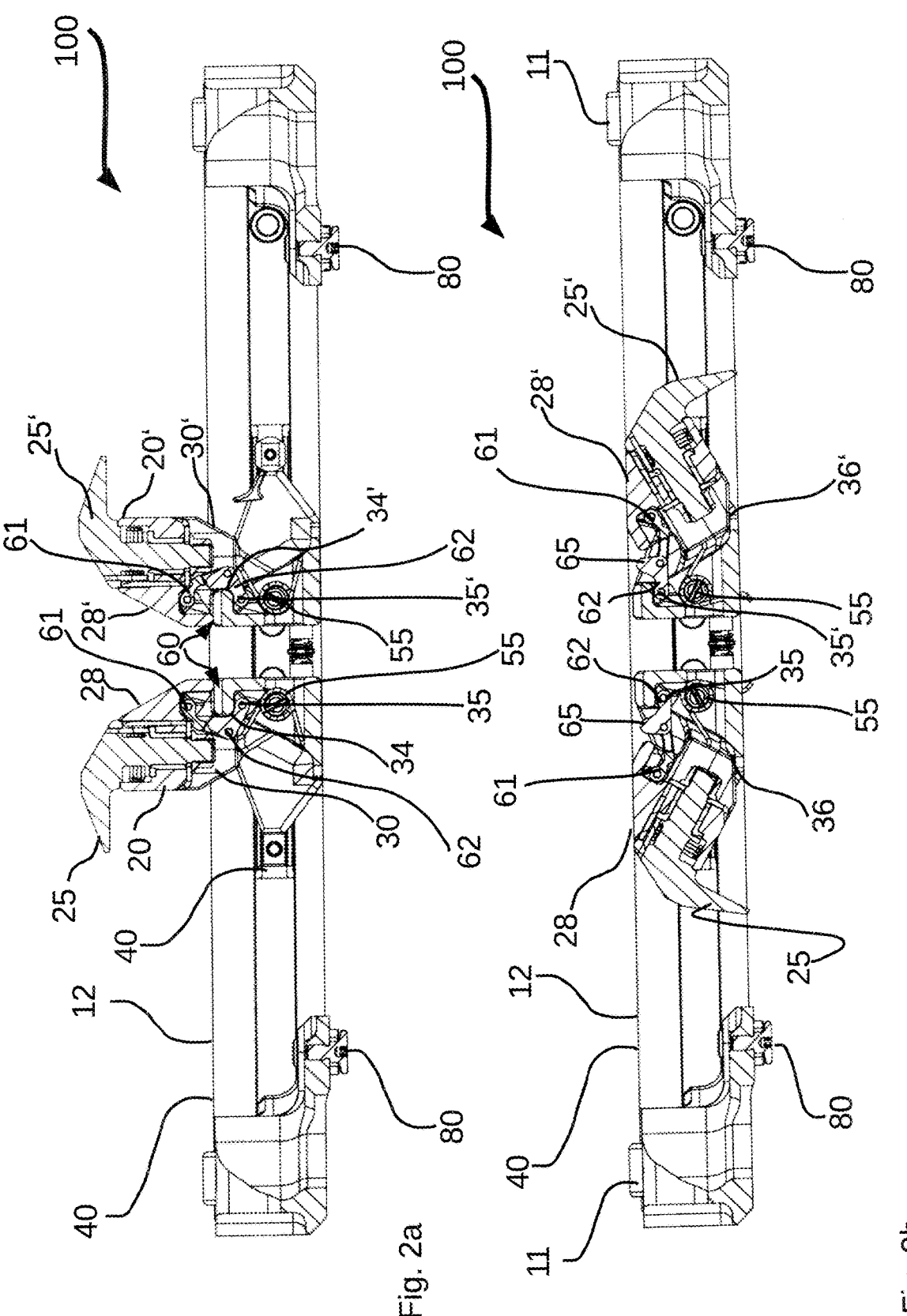
FIGS. 2a and 2b show a sectional view with fastening claws in an unfolded and a folded-down state.

FIG. 2a shows the unfolded state of the fastening claws 20, 20'. In this illustration, the compression spring 50 can also be seen, which resiliently spaces the two carriage elements 30, 30' from each other.

If one of the fastening claws 20, 20' is to be folded down, it can be folded down by applying appropriate force to the surface 28, 28' of the fastening claw 20, 20'. The fastening claws 20, 20' are rotatably mounted in relation to the carriage element 30, 30'. The axis of rotation 35, 35' can be seen accordingly.

Folding down is performed with the aid of a toggle mechanism 60. This toggle mechanism 60 has a first lever element 61 and a second lever element 62. The first lever element 61 is attached to the fastening claw 20, 20'. The second lever element 62 is attached to the carriage element 30, 30', respectively.

In FIG. 2b, the fastening claws 20, 20' are each shown in the folded-down and locked state. The fastening claws 20, 20' are folded down in such a way that they no longer project beyond the longitudinal member 15, 15'. The surface 28, 28' of the fastening claw 20, 20' is turned in such a way that it now lies flush with the uppermost side edge 12 of the longitudinal member 15, 15'. In this state of the fastening claws 20, 20', any cargo items and ULDs can be transported over the locking device 100 with the aid of the rollers 11.

In the position shown in FIG. 2*b*, the toggle mechanism 60, 60' is formed such that a section of the second lever element 62 faces upwards. This section serves as a release device 65. By applying slight pressure, which can be applied, for example, due to actuation by means of a foot, the toggle lever mechanism 60, 60' is released so that the fastening claws 20, 20' can be folded back up so that they can assume their original position as shown in FIG. 2*a*.

In order to be able to pivot upwards, i.e. to be able to assume a vertical position, corresponding springs 55 are formed in the carriage elements 30, 30', so that when the release device 65 is actuated by means of the springs 55, the fastening claws 20, 20' can be pivoted upwards.

Stop surfaces 34, 34' and 36, 36' are formed on the carriage elements 30, 30' to limit the pivoting movements of the fastening claws 20, 20'.

Figure 3:
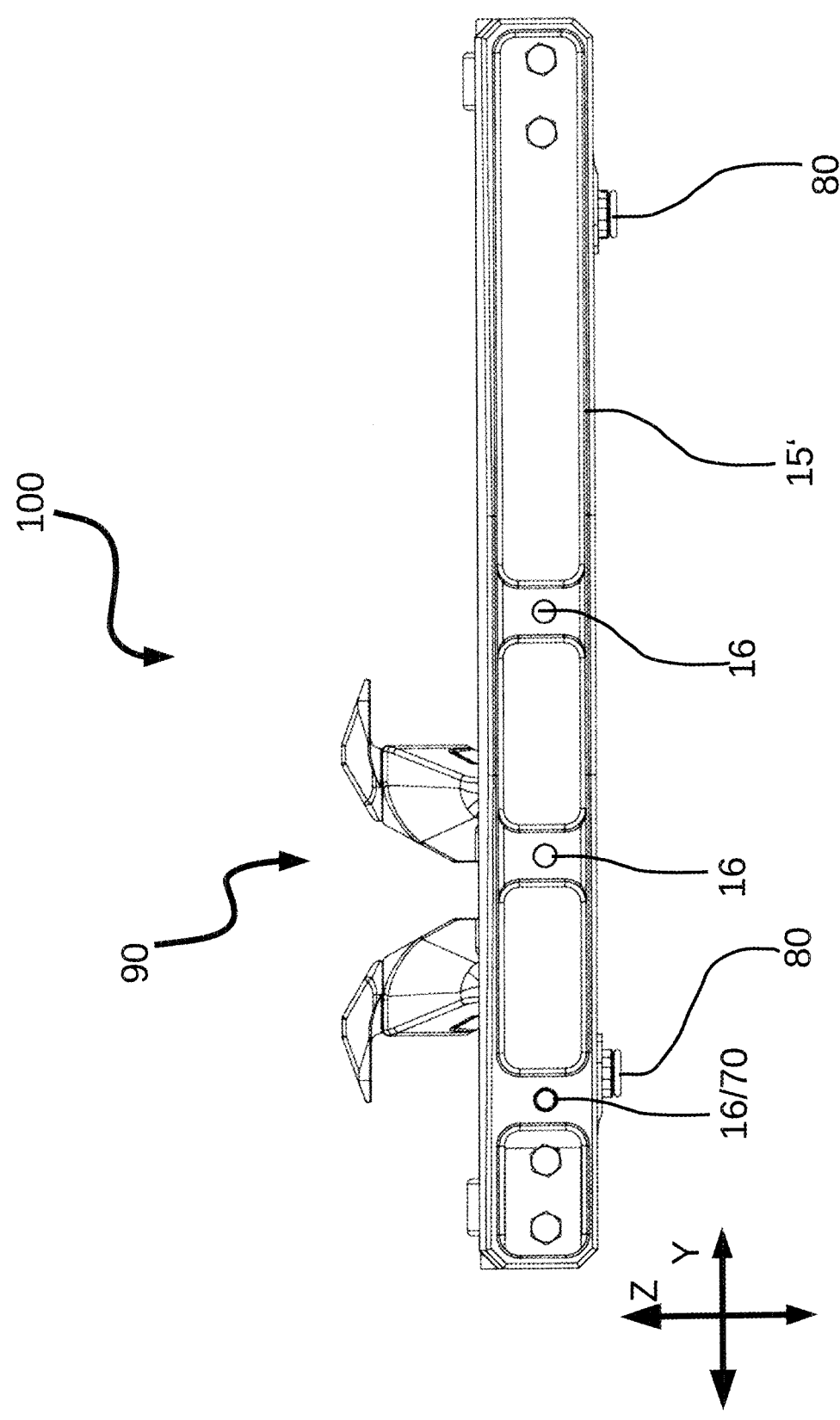
FIG. 3 shows a locking device according to the invention showing a displaced position of the fastening claws.

In FIG. 3, an alternative positioning of the assembly 90 is indicated. It can be seen that the fastening claws 20, 20' have been moved downwards (in relation to FIG. 1*a*) or to the left in the example shown. The fastening claws 20, 20' are arranged together with the locking lugs 25, 25' in an unfolded position. In the present case, the assembly 90 is fastened by means of a fastening pin 70 to the opening 16 formed on the leftmost side of the longitudinal member 15'.

In this side view, it can also be seen that the locking device 100 includes fastening means 80 for enabling the locking device 100 to be fastened to the floor of a cargo deck.

It should be noted at this point that, particularly with reference to the details shown in the drawings, features described in the context of separate embodiments can also be implemented in combination in a single embodiment. Conversely, various features that are described in the context of a single embodiment can also be implemented in multiple embodiments separately or in any suitable subcombination.

LIST OF REFERENCE SIGNS

10 Frame
11 Roller
12 Side edge
15, 15' Longitudinal member
16 Opening
18, 18' Cross member
19 Groove-shaped recess
20, 20' Fastening claw
25, 25' Locking lug
28, 28' Area
30, 30' Carriage element
34, 34' Stop surface
35, 35' Axis of rotation
36, 36' Stop surface
40, 40' Guide rail
50 Compression spring
55 Spring
60 Toggle mechanism
61 First lever element
62 Second lever element
65 Release device
70 Fastening pin
71 Lever
72 Slotted guide device
72 Fastening means
80 Assembly
100 Locking device

10

The invention claimed is:

1. A locking device for securing cargo items on a cargo deck of an aircraft, comprising:
a frame having at least two longitudinal members,
at least two fastening claws each with a locking lug, wherein the fastening claws are movably mounted on at least two respective carriage elements,
at least two guide rails,
wherein each guide rail can be fastened to a respective longitudinal member at different positions, and the at least two carriage elements are displaceably mounted on the guide rails,
wherein at least one compression spring is formed between the at least two carriage elements and is coupled thereto, so that the at least two carriage elements are spring-mounted with respect to each other, and
wherein the at least one compression spring resiliently spaces the at least two carriage elements from each other.

2. The locking device according to claim 1, wherein the guide rails are detachably fastened in or on the longitudinal members in such a way that the guide rails can be arranged variably with respect to their respective position in relation to the respective longitudinal member.

3. The locking device according claim 2, wherein the guide rails are detachably fastened in or on the longitudinal members in groove-shaped recesses of the longitudinal members.

4. The locking device according to claim 1, wherein the at least two guide rails, the at least two fastening claws and the at least two carriage elements form an assembly, wherein the assembly can be variably positioned and fastened in relation to the longitudinal members.

5. The locking device according to claim 1, wherein at least two spring units are formed between the carriage elements, wherein one spring unit comprises at least one compression spring.

6. The locking device according to claim 1, wherein at least one of the fastening claws is rotatably mounted on one of the carriage elements about an axis of rotation extending substantially perpendicular to the guide rails, wherein the fastening claw can be locked in a folded-down position by means of a toggle mechanism.

7. The locking device according to claim 6, wherein the toggle mechanism comprises a release device, wherein actuation of the release device releases the toggle mechanism from a locked position.

8. The locking device according to claim 1, wherein at least one of the guide rails is formed as a C-profile rail.

9. The locking device according to claim 1, wherein at least one of the guide rails is detachably fastened to at least one of the longitudinal members by means of a fastening pin, wherein the fastening pin engages in an opening of the guide rail.

10. The locking device according to claim 1, wherein at least one stop element for at least one of the carriage elements is formed in the guide rail.

11. The locking device according to claim 1, wherein at least one of the carriage elements has stop surfaces and/or stop edges which limit a pivoting movement of the fastening claw.

12. A cargo deck of an aircraft comprising at least one locking device according to claim 1, wherein the frame is fastened to the floor of the cargo deck.

13. A locking device for securing cargo items in a cargo deck of an aircraft, comprising:

a frame having at least two longitudinal members, at least two guide rails, wherein each guide rail can be fastened to a respective longitudinal member at different positions, at least one fastening claw with a locking lug, wherein the fastening claw is movably mounted on a carriage element, wherein the fastening claw is rotatably mounted on the carriage element about an axis of rotation which extends substantially perpendicular to the guide rails, wherein the fastening claw can be locked in a folded-down position by means of a toggle lever mechanism, wherein the toggle lever mechanism comprises a release device, wherein the release device releases the toggle lever mechanism from a locked position when actuated, and wherein the release device is formed as a section of at least one lever element of the toggle lever mechanism.

14. A cargo deck of an aircraft comprising at least one locking device according to claim 13, wherein the frame is fastened to the floor of the cargo deck.

15. The locking device according to claim 13, wherein, with the fastening claw locked in the folded-down position, the release device is arranged between the fastening claw and the carriage element and configured such that pressure applied to the release device releases the toggle mechanism from the locked position.

16. The locking device according to claim 15, wherein the toggle lever mechanism includes a first lever element coupled to the fastening claw and a second lever element coupled to the first lever element and to the carriage element, and wherein the release device is formed as a section of at least one of the first and second lever elements of the toggle lever mechanism.

* * * * *